Patented May 16, 1933

1,908,978

UNITED STATES PATENT OFFICE

GUENTHER HAMPRECHT, OF OPPAU, GERMANY, ASSIGNOR TO I. G. FARBENINDUSTRIE AKTIENGESELLSCHAFT, OF FRANKFORT-ON-THE-MAIN, GERMANY

PRODUCTION OF NONCAUSTIC CALCIUM CYANAMIDE

No Drawing. Application filed January 3, 1930, Serial No. 418,408, and in Germany February 20, 1929.

The present invention relates to the production of a non-caustic calcium cyanamide which is free from dust.

When employing crude calcium cyanamide for fertilizing purposes, its caustic nature and its tendency to form dust are particularly unpleasant. Many attempts have been made to obviate this objection, but none of them has had success industrially.

I have now found that a non-caustic calcium cyanamide which is free from dust is obtained in a simple manner by treating the crude calcium cyanamide, before or after its degasification, with solid ammonium salts which are preferably finely divided or with solid acids. By this treatment the free caustic lime contained in the crude calcium cyanamide is neutralized at least partly; no decomposition of the calcium cyanamide taking place. The treatment is carried out in the absence of water and generally speaking at temperatures not above about 150° centigrade.

According to the present invention it is not necessary to neutralize the whole of the free lime, but, in order to obtain a product free from dust, it suffices to neutralize only a part thereof. The process is applicable to crude calcium cyanamide prepared from any source, for example from calcium carbide, or from calcium carbonate and ammonia.

It is particularly advantageous to employ ammonium nitrate and in this manner ammonia is evolved even at ordinary temperatures, when the crude calcium cyanamide and the ammonium salt are mixed. The ammonia may be completely split off by gentle heating and may be recovered. Also crystalline phosphoric acid is very suitable for the purposes of the present invention. When working with solid acids, even the whole treatment may be carried out at ordinary temperature.

The treatment with ammonium nitrate involves the particular advantage that the resulting calcium cyanamide is not only non-caustic and free from dust, but that it is obtained in a granular form readily capable of being scattered. This advantage is not experienced when treating the crude calcium cyanamide with solid acids, but also in this case the resulting product may be rendered granular and readily capable of being scattered by subsequently treating it with ammonium nitrate. For example, the crude calcium cyanamide may first be treated with an amount of crystalline phosphoric acid insufficient for neutralizing the caustic lime present, and then the mass may be treated with ammonium nitrate, thereby further or even completely neutralizing the product. In this way a granular calcium cyanamide is obtained which also contains nitrate and phosphate.

The following examples will further illustrate the nature of this invention, but the invention is not restricted to these examples.

Example 1

100 kilograms of crude calcium cyanamide containing 21 per cent of nitrogen in the form of calcium cyanamide and 25 per cent of free lime (CaO) are mixed with 10 kilograms of finely ground ammonium nitrate and are passed through a rotary drum heated to about 100° centigrade. 108 kilograms of a well granulated product are obtained, which no longer gives rise to dust. The content of nitrogen amounts to 19.5 per cent combined in the form of calcium cyanamide and 1.6 per cent combined in the form of calcium nitrate. The ammonia set free may be reconverted into ammonium nitrate by means of nitric acid.

Instead of pure ammonium salts industrial products containing the same, for example commercial calcium nitrate $Ca(No_3)_2.2H_2O$ containing about 5 per cent of ammonium nitrate, may be employed.

Example 2

100 kilograms of crude calcium cyanamide containing 25 per cent of free lime (CaO) are mixed with 20 kilograms of crystalline finely ground phosphoric acid. The mass becomes hot in consequence of the neutralization of the lime. The final product is non-hygroscopic and no longer gives rise to dust.

Example 3

100 kilograms of crude calcium cyanamide containing 21 per cent of nitrogen in the form of calcium cyanamide and 25 per cent of free lime are ground with 20 kilograms of crystalline phosphoric acid. Thereafter the product is mixed with 20 kilograms of solid ammonium nitrate and passed through a revolving furnace heated to about 100° centigrade. Thereby 135 kilograms of a granular product free from dust are obtained, the granules of which have a diameter of several millimeters, and which contains 15.6 per cent of nitrogen in the form of calcium cyanamide, 2.6 per cent of nitrogen in the form of nitrate, and 10.7 per cent of $P_2O_5$.

What I claim is:—

1. The process of producing non-caustic calcium cyanamide free from dust which comprises heating crude calcium cyanamide in the absence of water with ammonium nitrate.

2. The process of producing non-caustic calcium cyanamide free from dust which comprises heating crude calcium cyanamide in the absence of water with ammonium nitrate at a temperature not exceeding 150° centigrade.

3. The process of producing non-caustic calcium cyanamide free from dust which comprises heating crude calcium cyanamide in the absence of water with ammonium nitrate at about 100° centigrade.

In testimony whereof I have hereunto set my hand.

GUENTHER HAMPRECHT.